(12) United States Patent
Vallance et al.

(10) Patent No.: US 11,803,020 B2
(45) Date of Patent: Oct. 31, 2023

(54) OPTICAL BENCH SUBASSEMBLY HAVING INTEGRATED PHOTONIC DEVICE

(71) Applicant: SENKO ADVANCED COMPONENTS, INC., Hudson, MA (US)

(72) Inventors: Robert Ryan Vallance, Newbury Park, CA (US); Shuhe Li, Pasadena, CA (US)

(73) Assignee: Senko Advanced Components, Inc, Hudson, MA (US)

( * ) Notice: Subject to any disclaimer, the term of this patent is extended or adjusted under 35 U.S.C. 154(b) by 0 days.

(21) Appl. No.: 16/999,021

(22) Filed: Aug. 20, 2020

(65) Prior Publication Data

US 2021/0132308 A1 May 6, 2021

Related U.S. Application Data

(63) Continuation of application No. 16/372,377, filed on Apr. 1, 2019, now Pat. No. 10,754,110, which is a
(Continued)

(51) Int. Cl.
*G02B 6/42* (2006.01)
*G02B 6/38* (2006.01)
*G02B 6/36* (2006.01)

(52) U.S. Cl.
CPC ......... *G02B 6/4248* (2013.01); *G02B 6/3652* (2013.01); *G02B 6/4214* (2013.01); *G02B 6/4246* (2013.01); *G02B 6/4292* (2013.01); *G02B 6/3833* (2013.01); *G02B 6/3839* (2013.01); *G02B 6/4249* (2013.01); *Y10T 29/49* (2015.01)

(58) Field of Classification Search
CPC .. G02B 6/4214; G02B 6/4224; G02B 6/4228; G02B 6/4248
See application file for complete search history.

(56) References Cited

U.S. PATENT DOCUMENTS 4,945,400 A * 7/1990 Blonder ............... G02B 6/4277
257/116
6,402,394 B1 * 6/2002 Heinrich ............... G02B 6/4246
385/88
(Continued)

*Primary Examiner* — Sung H Pak
*Assistant Examiner* — Hoang Q Tran

(57) ABSTRACT

An optical bench subassembly including an integrated photonic device. Optical alignment of the photonic device with the optical bench can be performed outside of an optoelectronic package assembly before attaching thereto. The photonic device is attached to a base of the optical bench, with its optical input/output in optical alignment with the optical output/input of the optical bench. The optical bench supports an array of optical fibers in precise relationship to a structured reflective surface. The photonic device is mounted on a submount to be attached to the optical bench. The photonic device may be actively or passively aligned with the optical bench. After achieving optical alignment, the submount of the photonic device is fixedly attached to the base of the optical bench. The optical bench subassembly may be structured to be hermetically sealed as a hermetic feedthrough, to be hermetically attached to a hermetic optoelectronic package.

20 Claims, 7 Drawing Sheets

Related U.S. Application Data continuation of application No. 15/077,816, filed on Mar. 22, 2016, now abandoned, which is a continuation-in-part of application No. 14/714,211, filed on May 15, 2015, now Pat. No. 9,782,814, which is a continuation-in-part of application No. 14/695,008, filed on Apr. 23, 2015, now abandoned, said application No. 15/077,816 is a continuation-in-part of application No. 13/861,273, filed on Apr. 11, 2013, now abandoned, which is a continuation-in-part of application No. 13/786,448, filed on Mar. 5, 2013, now abandoned.

(60) Provisional application No. 62/136,601, filed on Mar. 22, 2015, provisional application No. 61/994,094, filed on May 15, 2014, provisional application No. 61/699,125, filed on Sep. 10, 2012, provisional application No. 61/623,027, filed on Apr. 11, 2012, provisional application No. 61/606,885, filed on Mar. 5, 2012.

(56) References Cited

U.S. PATENT DOCUMENTS

2006/0233497 A1* 10/2006 Hoshino ............... G02B 6/423
                                                                    385/88
2013/0265770 A1* 10/2013 Breidenassel ....... H01S 5/02253
                                                                    362/296.01

* cited by examiner

OPTICAL BENCH SUBASSEMBLY HAVING INTEGRATED PHOTONIC DEVICE

1. PRIORITY CLAIM

This application is a continuation of U.S. patent application Ser. No. 16/372,377 filed on Apr. 1, 2019, which is a continuation of U.S. patent application Ser. No. 15/077,816 filed on Mar. 22, 2016, which:
 (1) claims the priority of U.S. Provisional Patent Application No. 62/136,601 filed on Mar. 22, 2015;
 (2) is a continuation-in-part of U.S. patent application Ser. No. 13/861,273 filed on Apr. 11, 2013, which:
  (a) claims the priority of U.S. Provisional Patent Application No. 61/623,027 filed on Apr. 11, 2012,
  (b) claims the priority of U.S. Provisional Patent Application No. 61/699,125 filed on Sep. 10, 2012, and
  (c) is a continuation-in-part of U.S. patent application Ser. No. 13/786,448 filed on Mar. 5, 2013, which claims the priority of U.S. Provisional Patent Application No. 61/606,885 filed on Mar. 5, 2012; and
 (3) is a continuation-in-part of U.S. patent application Ser. No. 14/714,211 filed on May 15, 2015, now U.S. Pat. No. 9,782,814, which:
  (a) claims the priority of U.S. Provisional Patent Application No. 61/994,094 filed on May 15, 2014, and
  (b) is a continuation-in-part of U.S. patent application Ser. No. 14/695,008 filed on Apr. 23, 2015.

These applications are fully incorporated by reference as if fully set forth herein. All publications noted below are fully incorporated by reference as if fully set forth herein.

BACKGROUND OF THE INVENTION

Field of the Invention

The present invention relates to optical bench subassemblies, particularly optical fiber subassemblies based on optical benches, and more particularly hermetic optical fiber feedthrough subassemblies based on optical benches.

Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. The data communication systems involve devices that couple fibers in an end-to-end relationship, including optoelectronic or photonic devices that include optical and electronic components that source, detect and/or control light, converting between light signals and electrical signals.

For example, a transceiver (Xcvr) is an optoelectronic module comprising both a transmitter (Tx) and a receiver (Rx) which are combined with circuitry within a module housing, which is known in the art as a package. The package may be hermetically sealed to protect its contents from the environment. The transmitter includes a light source (e.g., a VCSEL or DFB laser), and the receiver includes a light sensor (e.g., a photodiode (PD)). Heretofore, a transceiver's circuitry (e.g., including a laser driver, transimpedance amplifier (TIA), etc.) is soldered onto a printed circuit board. Such a transceiver generally has a substrate that forms the bottom or floor of the package (either hermetic or non-hermetic), and then optoelectronic devices such as lasers and photodiodes are soldered onto the substrate. Optical fibers are connected to the exterior of the package or fed through the wall of the package using a hermetic feedthrough (see, US20130294732A1, which had been commonly assigned to the Assignee/Applicant of the present application, and is fully incorporated as if fully set forth herein).

The end of the optical fiber is optically coupled to the optoelectronic devices held within the housing. A feedthrough element supports the portion of the optical fiber through the wall opening. For a variety of applications, it is desirable to hermetically seal the optoelectronic devices within the housing of the optoelectronic module, to protect the components from corrosive media, moisture and the like. Since the package of the optoelectronic module must be hermetically sealed as whole, the feedthrough element must be hermetically sealed, so that the electro-optic components within the optoelectronic module housing are reliably and continuously protected from the environment.

For proper operation, an optoelectronic device supported on a printed circuit board needs to efficiently couple light to an external optical fiber. Some optoelectronic devices require single-mode optical connections that require stringent alignment tolerances between optical fibers and the devices, typically less than 1 micrometer. This is challenging especially for multiple fiber applications, where multiple optical fibers need to be optically aligned to multiple optoelectronic devices using an active optical alignment approach in which the position and orientation of the optical fiber(s) is adjusted by machinery until the amount of light transferred between the fiber and optoelectronic is maximized.

FIGS. 1A and 1B depict a hermetically sealed optoelectronic package 500, having a hermetic multi-fiber feedthrough 502, in which the hermetic feedthrough 502 is actively aligned with the photonic device 504 mounted on a submount 506 supported by the floor of the package 500. In this example, the feedthrough 502 resembles the optical coupling device disclosed in US2016/0016218A1, which had been commonly assigned to the Assignee/Applicant of the present application, and is fully incorporated as if fully set forth herein). The photonic device 504 may include a VCSEL array and/or PD array, which is supported on the package floor, e.g., via a submount 506 and a printed circuit board 508. The printed circuit board 508 is populated with other electronic components and circuits, and the package 500 may include several printed circuit boards. After assembling the photonic device 504/submount 506 and other components into the package 500, the feedthrough 504 is inserted through an opening 503 defined by a snout 50 on the sidewall of the housing 501 of the package 500. The array of optical fibers 20 of an optical fiber cable 21 is supported by the feedthrough 502, and are actively aligned with the photonic device 504, to achieve the desired optical coupling efficiency between the photonic device and the array of optical fibers 20. This process requires the photonic device 504 and associated electronics (not shown) to be preassembled into the package 500. The photonic device 504 is activated/energized to transmit/receive an optical signal 22 to/from the array of optical fibers 20. Essentially, optical signals to/from the optical fibers 20 are optimally coupled to the photonic device 504 when the signal 22 transferred between the optical fibers 20 and the photonic device 504 is maximized. The feedthrough 502 is then soldered into the snout 50 at the package sidewall of the housing 501 in the optically aligned state.

Active optical alignment involves relatively complex, low throughput processes since the VCSEL or PD must be energized during the active alignment process. Manufacturers of integrated circuits often have expensive capital equipment capable of sub-micron alignment (e.g. wafer probers and handlers for testing integrated circuits), whereas companies that package chips generally have less capable machinery (typically several micron alignment tolerances which is not adequate for single-mode devices) and often use manual operations.

The current state of the art is expensive due to the inclusion of a package, excludes the use of common electronics and assembly processes, and/or often not suited to single-mode applications. The package is a relatively more expensive assembly (which includes expensive circuit components, such as ICs, etc.) as compared to the hermetic feedthrough subassembly. Given the required preassembly of components in the package to support active optical alignment, and further given the active alignment and soldering process involve high risk steps towards the end of the overall packaging process, failure to achieve active alignment because of defective components, which may be induced in the active alignment process, would lead to the entire package being discarded, including the photonic devices and other components already packaged therein.

In addition, while VCSEL and PD components may be tested in a static state prior to assembly, however they cannot be tested in an operational state until assembled in the package along with the electronics to drive these components. Accordingly, burn-in process (to identify earlier-life component failures under simulated load conditions) of the VCSEL and PD components can only be conducted after assembly of these components into the package. This would lead to further waste of packages (i.e., low yield of packages) that are relatively more expensive module as assembled, as a result of defective but relatively inexpensive VCSEL and PD components. VCSEL and PD components are known to contribute to a relatively high number of failures of assembled packages.

A further failure mode leading to waste of assembled packages is caused by the relatively larger and more compliant structural loop (represented by dotted line L in FIG. 1B) that maintains optical alignment between the photonic device and the feedthrough, as shown in FIG. 1B. The long structural loop is more sensitive to thermal-mechanical deformations, which could render the package to stray outside of intended design specification, thus resulting in failure mode.

What is needed is an improved structure to couple the input/output of optical fibers in optical alignment to optoelectronic components/photonic devices, which improves throughput, tolerance, manufacturability, ease of use, functionality and reliability at reduced costs.

SUMMARY OF THE INVENTION

The present invention provides an improved structure to facilitate optical alignment of photonic device to an optical bench, which overcomes the drawbacks of the prior art. The present invention combines a photonic device with an optical bench in a subassembly, so that alignment of the optical coupling of the photonic device with the optical bench can be performed outside of the optoelectronic package assembly.

In accordance with the present invention, the photonic device is attached to a base of the optical bench, with its optical input/output in optical alignment with the optical output/input of the optical bench.

In one embodiment, the optical bench supports an optical component in the form of an optical wave guide (e.g., an optical fiber). In a more specific embodiment, the base of the optical bench defines an alignment structure in the form of at least one groove to precisely support the end section of an optical fiber. An optical element (e.g., a lens, a prism, a reflector, a mirror, etc.) may be provided in precise relationship to the end face of the optical fiber. In a further embodiment, the optical element comprises a structured surface, which may be planar reflective or concave reflective (e.g., an aspherical mirror surface).

In one embodiment, the photonic device may be mounted on a submount, which is attached to the base of the optical bench in optical alignment with the optical bench. The submount may be provided with circuits, electrical contact pads, circuit components (e.g., a driver for VCSEL, a TIA for a PD), and other components and/or circuits associated with the operation of the photonic device.

The photonic device may be passively aligned with the optical bench (e.g., relying on alignment indicia provided on the base of the bench). Alternatively, the photonic device and the optical bench may be actively aligned by passing an optical signal between the optical waveguide in the optical bench and the photonic device. The photonic device (e.g., a VCSEL and/or PD) can be activated to allow for active alignment with the optical waveguide (e.g., an optical fiber) supported in the optical bench, without relying on the other components within the package. After achieving optical alignment, the submount of the photonic device is fixedly attached to the base of the optical bench.

The base of the optical bench is preferably formed by stamping a malleable material (e.g., metal), to form precise geometries and features of the optical bench. The optical bench subassembly can be structured to be hermetically sealed.

In another embodiment of the present invention, the optical bench is structured to support multiple waveguides (e.g., multiple optical fiber), and structure reflective surfaces (e.g., an array of mirrors), to work with an array of photonic devices (VCSELs and/or PDs) mounted on a submount.

The present invention preassemblies optical elements and components and photonic devices precisely in an optical bench subassembly, prior to assembling into the larger optoelectronic package. The subassembly can be functionally tested, including burn-in tests, in a subassembly level, outside of a optoelectronic package, thus reducing waste of more expensive optoelectronic packages arising from early failure in the photonic devices installed therein.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 6A to 6C illustrate the sequence of assembly of a hermetic optoelectronic package, wherein FIG. 6A depicts assembly of a photonic device assembly; FIG. 6B depicts assembly of the photonic device assembly to the optical bench and active alignment; FIG. 6C depicts assembly of the hermetic optoelectronic package.

DETAILED DESCRIPTION OF THE PREFERRED EMBODIMENTS

Figure 1A:
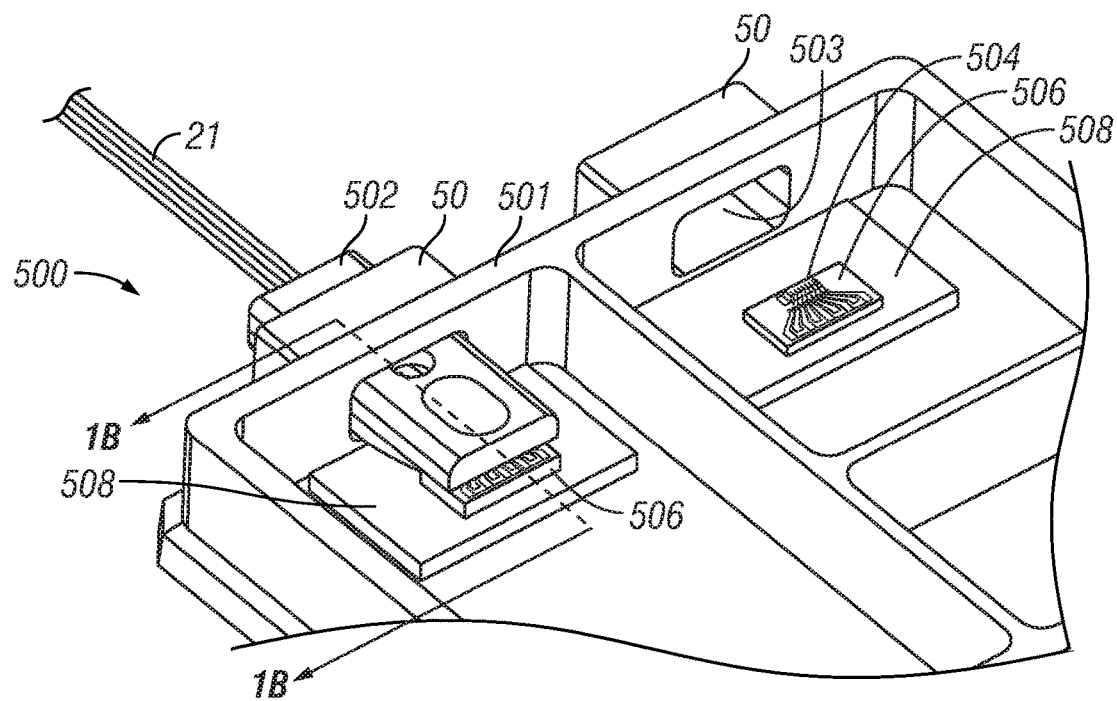
FIG. 1A illustrates a hermetic optoelectronic package including a hermetic optical fiber feedthrough.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides an improved structure to facilitate optical alignment of photonic device to an optical bench, which overcomes the drawbacks of the prior art. The present invention combines a photonic device with an optical bench in a subassembly, so that alignment of the optical coupling of the photonic device with the optical bench can be performed outside of the optoelectronic package assembly.

In accordance with the present invention, the photonic device is attached to a base of the optical bench, with its optical input/output in optical alignment with the optical output/input of the optical bench. Various embodiments of the present invention incorporate some of the inventive concepts developed by the Assignee of the present invention, nanoPrecision Products, Inc., including various proprietary including optical bench subassemblies for use in connection with optical data transmissions, including the concepts disclosed in the patent publications discussed below, which have been commonly assigned to the Assignee. The priority of pending applications had been claimed herein.

For example, U.S. Patent Application Publication No. US2013/0322818A1 discloses an optical coupling device for routing optical signals, which is in the form of an optical bench having a stamped structured surface for routing optical data signals. The optical bench comprising a metal base having a structured surface defined therein, wherein the structured surface has a surface profile that bends, reflects, and/or reshapes an incident light. The base further defines an alignment structure, which is configured with a surface feature to facilitate precisely positioning an optical component (e.g., an optical fiber) on the base in precise optical alignment with the structured surface to allow light to be transmitted along a defined path between the structured surface and the optical component, wherein the structured surface and the alignment structure are integrally defined on the base by stamping a malleable metal material to form an optical bench.

U.S. Patent Application Publication No. US2015/0355420A1 further discloses an optical coupling device for routing optical signals for use in an optical communications module, in particular an optical coupling device in the form of an optical bench, in which defined on a metal base is a structured surface having a surface profile that bends, reflects and/or reshapes an incident light. An alignment structure is defined on the base, configured with a surface feature to facilitate positioning an optical component (e.g., an optical fiber) on the base in optical alignment with the structured surface to allow light to be transmitted along a defined path between the structured surface and the optical component. The structured surface and the alignment structure are integrally defined on the base by stamping a malleable metal material of the base. The alignment structure facilitates passive alignment of the optical component on the base in optical alignment with the structured surface to allow light to be transmitted along a defined path between the structured surface and the optical component.

U.S. Patent Application Publication No. US2013/0294732A1 further discloses a hermetic optical fiber alignment assembly having an integrated optical element, in particular a hermetic optical fiber alignment assembly including an optical bench that comprises a metal ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping a malleable metal to define those features on a metal base.

U.S. Pat. No. 9,213,148 further discloses a similar hermetic optical fiber alignment assembly, but without an integrated structured reflective surface.

U.S. Pat. No. 7,343,770 discloses a novel precision stamping system for manufacturing small tolerance parts. Such inventive stamping system can be implemented in various stamping processes to produce the devices disclosed in the above-noted patent publications. These stamping processes involve stamping a bulk material (e.g., a metal blank), to form the final overall geometry and geometry of the surface features at tight (i.e., small) tolerances, including reflective surfaces having a desired geometry in precise alignment with the other defined surface features.

U.S. Patent Application Publication No. US2016/0016218A1 further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment feature, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the bulk material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

U.S. Pat. No. 8,961,034 discloses a method of producing a ferrule for supporting an optical fiber in an optical fiber connector, comprising stamping a metal blank to form a body having a plurality of generally U-shaped longitudinal open grooves each having a longitudinal opening provided on a surface of the body, wherein each groove is sized to securely retain an optical fiber in the groove by clamping the optical fiber. The optical fiber is securely retained in the body of the ferrule without the need for additional fiber retaining means.

PCT Patent Application Publication No. WO2014/011283A2 discloses a ferrule for an optical fiber connector, which overcomes many of the drawbacks of the prior art ferrules and connectors, and further improves on the above noted pin-less alignment ferrules. The optical fiber connector includes an optical fiber ferrule, which has a generally oval cross-section for aligning an array of multiple optical fibers to optical fibers held in another ferrule using a sleeve.

The above inventive concepts are incorporated by reference herein, and will be referred below to facilitate disclosure of the present invention. The present invention is disclosed in connection with exemplary embodiments of hermetic optical fiber feedthrough for hermetic optoelectronic packages, which includes an optical bench subassembly with an integrated photonic device.

Figure 2A:
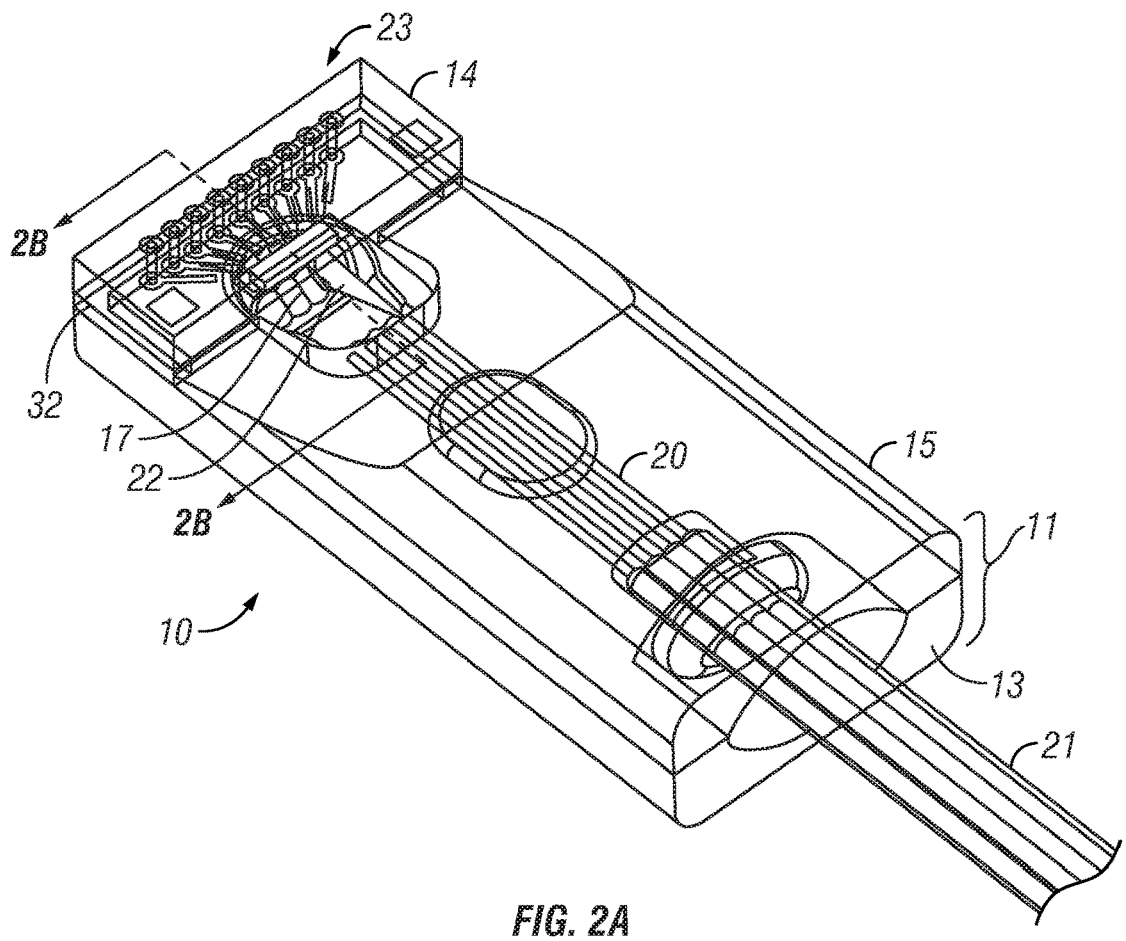
FIG. 2A illustrates an optical bench subassembly in the form of a hermetic feedthrough, including an integrated photonic device, in accordance with one embodiment of the present invention.
Figure 2B:
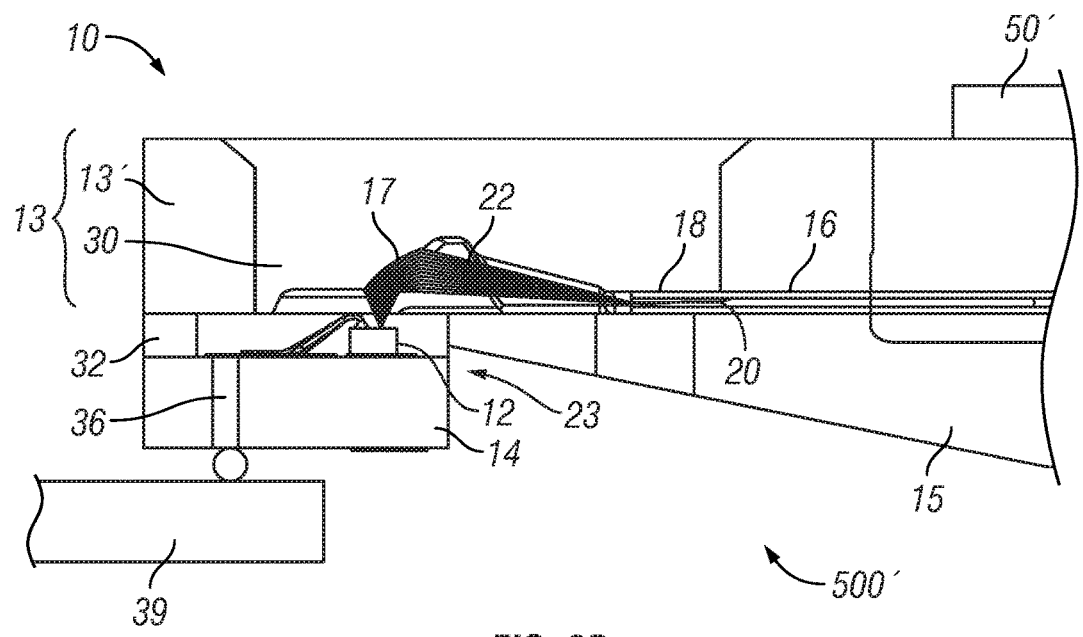
FIG. 2B is a sectional view taken along line 2B-2B in FIG. 2A, shown as installed in a hermetic optoelectronic package.

FIGS. 2A and 2B illustrate one embodiment of a hermetic optical fiber feedthrough, in the form of an optical bench subassembly 10 that includes an optical bench 11 having an integrated photonic device 12 in accordance with one embodiment of the present invention. In the illustrated embodiment, the photonic device 12 is mounted on a submount 14, which is attached to the optical bench 11, at a location in alignment with the optical input/output of the optical bench 11 (see optical signal 22 in FIG. 2B).

Figure 3A:
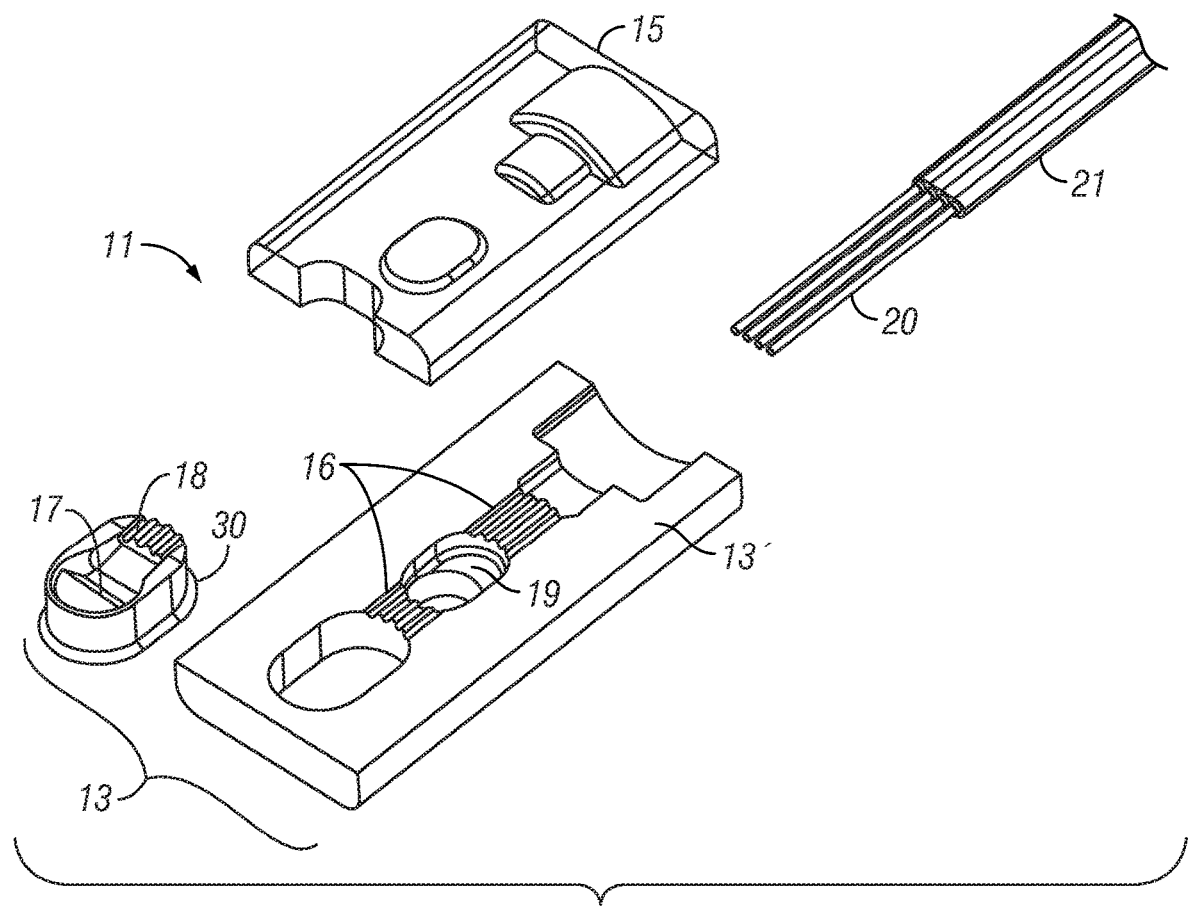
FIG. 3A is an expanded view of the optical bench in the optical bench subassembly in FIG. 2, in accordance with one embodiment of the present invention.
Figure 3B:
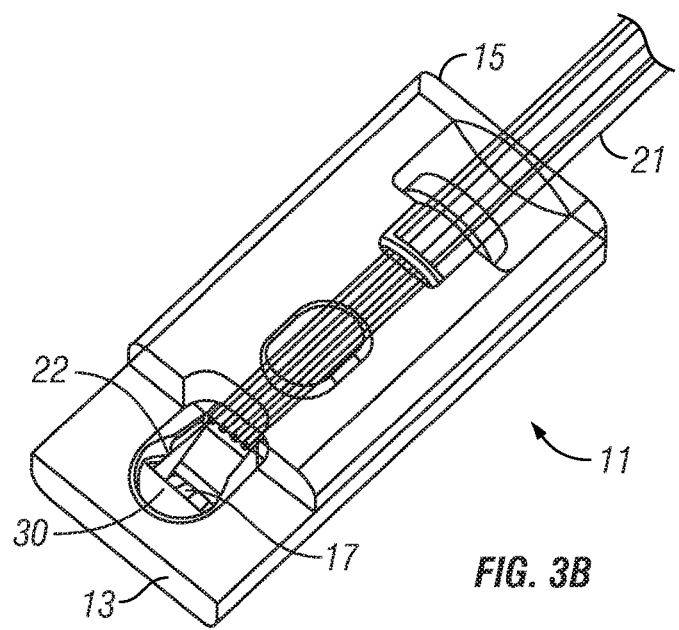
FIG. 3B is an assembled view of the optical bench.

FIGS. 3A and 3B illustrate more clearly the structure of the optical bench 11 in the optical bench subassembly 10. In this embodiment, the optical bench 11 resembles the hermetic multi-fiber alignment subassembly disclosed in Assignee's US2016/0016218A1 referenced above. The optical bench supports one or more optical waveguides, which in the illustrated embodiment is a plurality of optical fibers 20 of an optical fiber cable 21. For the case of multiple fibers, the base 13 of the optical bench 11 defines a plurality of open grooves 16 supporting the optical fibers 20, and defines or supports an optical element (e.g., a lens, a prism, a reflector, a mirror, etc.). In the illustrated embodiment, the optical element comprises an array of structured reflective surfaces 17, each corresponding to an optical fiber 20. The reflective surface may be planar reflective or contoured to be concave reflective (e.g., an aspherical mirror surface) or convex reflective. In the illustrated embodiment, the base 13 comprises a composite structure, including an auxiliary portion 30 of a material dissimilar to the material of the rest of the base 13 (i.e., the main portion 13'). The base 13 including the auxiliary portion 30 are stamped from malleable materials to form the body geometry and the desired surface features. In this case, the auxiliary portion is shaped by stamping a malleable metallic material to form the array of structured reflective surfaces 17 and grooves 18, while the base 13 is stamped from a different malleable metallic material to form the grooves 16 and the other structures shown. As disclosed in US2016/0016218A1, as the auxiliary portion 17 is stamped, it interlocks with the base 13, resembling a rivet, and at the same time forming the desired structured features on the auxiliary portion 30, including the array of structured reflective surfaces 17, and optical fiber alignment grooves 18 for supporting the end sections of the optical fibers 20, such that each reflective surface 17 and an end face (i.e., the input/output) of a corresponding optical fiber 20 are maintained in precise relationship. In this embodiment, the auxiliary portion 17 and the main portion 13' are stamped using dissimilar metallic materials.

The open grooves 16 and 18 may be configured and formed in accordance with the stamped open grooves disclosed in U.S. Pat. No. 8,961,034, which clamps the optical fibers in securely in the groove without requiring additional securing means (e.g., no epoxy, etc.). In the illustrated embodiment, a cover 15 is provided to cover the base 13 without covering the structured reflective surfaces 17. A hermetic sealing epoxy (e.g., glass epoxy) is applied to fill the spaces around the sections of the optical fibers 20 in the cavity 19 between the cover 15 and the base 13, to form a hermetic seal to make the optical bench 11 a hermetic feedthrough, which can be used with a optoelectronic package in a similar function as the hermetic feedthrough 502 in FIG. 1A, except that the optical bench 11 has a photonic device integrated thereon to form the optical bench assembly 10 in accordance with the present invention. Further elaborations of similar hermetic feedthrough structures may be found in US2013/0294732A1.

Figure 4A:
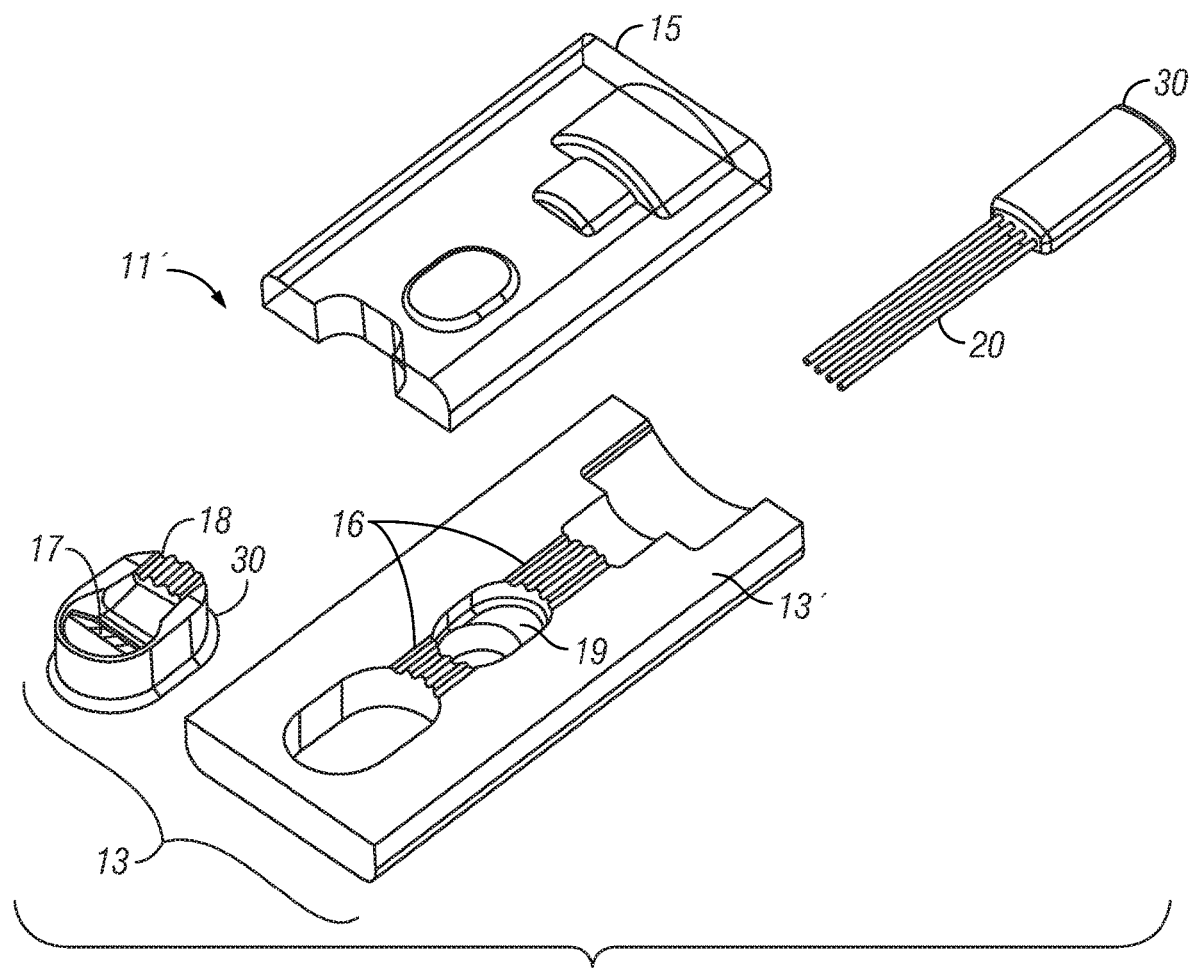
FIG. 4A is an expanded view of the optical bench in the optical bench subassembly, in accordance with another embodiment of the present invention.
Figure 4B:
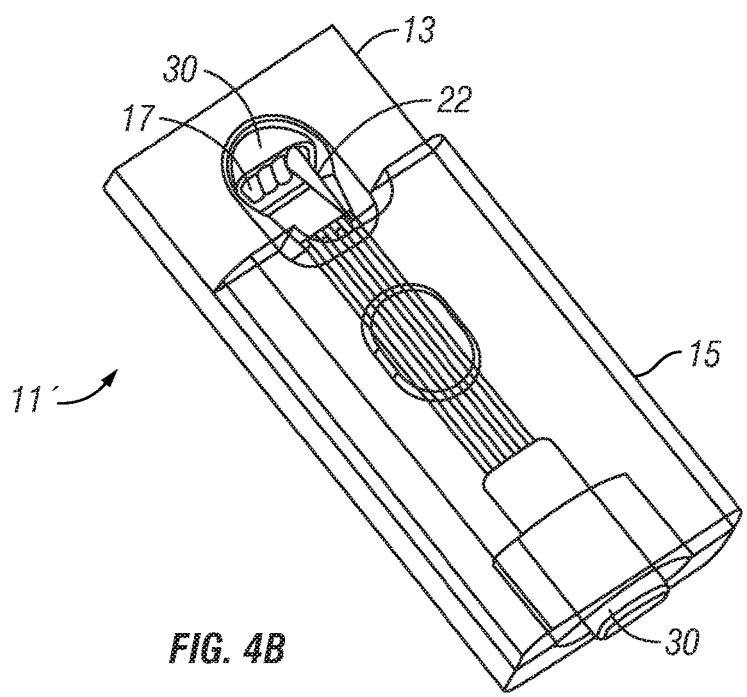
FIG. 4B is an assembled view of the optical bench.

FIGS. 4A and 4B illustrate another embodiment of an optical bench 11', which is similar to the optical bench 11 in FIGS. 3A and 3B, with the exception of the fiber cable 21. In this embodiment, the optical bench 11' is provided with a demountable connection in the form of a ferrule 30. Instead of an optical fiber 21 extending away from the optical bench 11', the ferrule 30 supports the rear end sections of short sections of optical fibers 20, with the distal front end sections of the optical fibers supported by the grooves 16 and 18 within the optical bench 11'. The ferrule 30 may be structured to have a generally oval cross-section, as disclosed in WO2014/011283A2. A sleeve (not shown) can be used to couple to, for example, an optical fiber cable (e.g., a patch cable) that is terminated with a similar ferrule. In this embodiment, if the connecting optical fiber becomes defective, it can be disconnected and replaced, without having to replace the entire optoelectronic package to which the optical bench 11' is permanently or fixedly attached.

Turning now to the photonic device, in the illustrated embodiment of FIGS. 2A and 2B, the photonic device 12 is mounted on a submount 14 to form a photonic device assembly 23. The submount 14 may be provided with circuits, electrical contact pads, circuit components (e.g., a driver for VCSEL, a TIA for a PD), and other components and/or circuits associated with the operation of the photonic device 12.

Figure 6A:
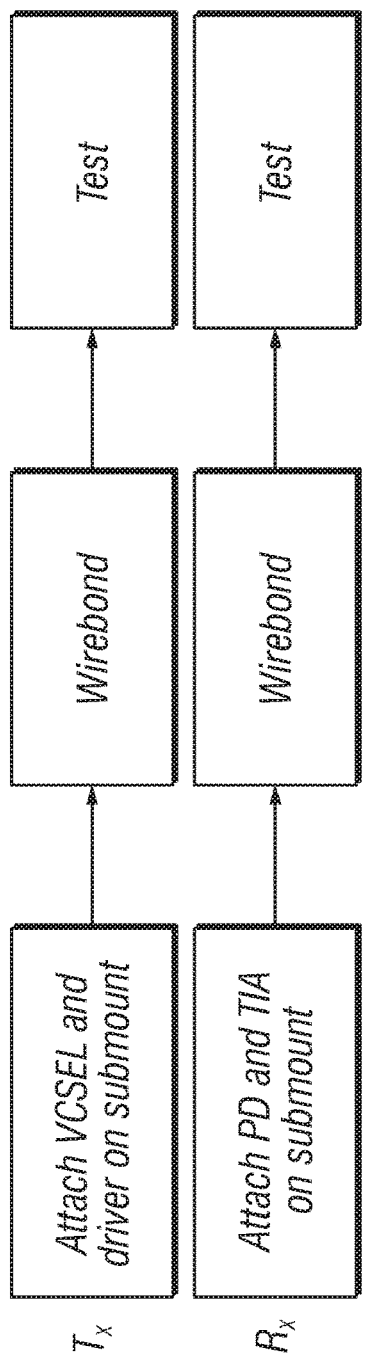
Figure 6B:
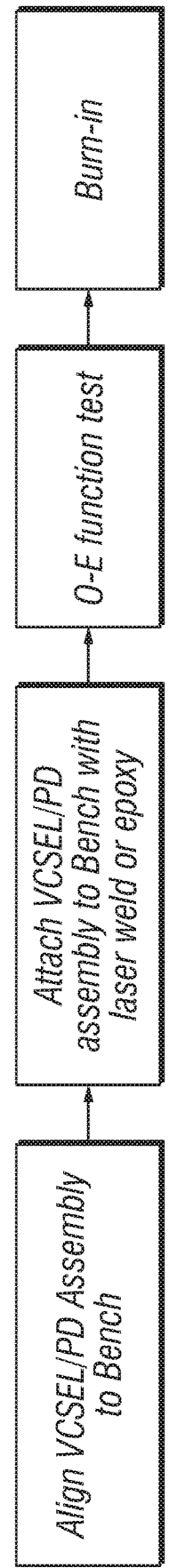
Figure 6C:
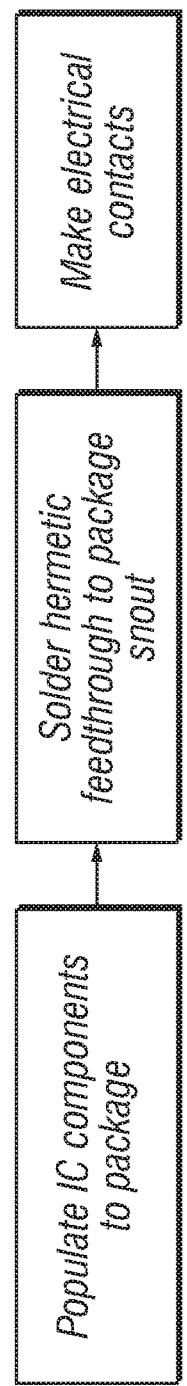

FIGS. 6A to 6C illustrate the sequence of assembly of a hermetic optoelectronic package. FIG. 6A depicts assembly of a photonic device (a transmitter or a receiver or a transceiver) assembly; FIG. 6B depicts assembly of the photonic device assembly to the optical bench and active alignment; FIG. 6C depicts assembly of the hermetic optoelectronic package.

Referring to FIG. 6A, in the case where the photonic device 12 is a transmitter, such as a VCSEL, it is mounted on the submount 14, along with a driver chip. The VCSEL may be wirebonded to the circuit on the submount 14. Test may be performed to confirm that the VCSEL is operative to transmit an optical signal after assembly. In the case where the photonic device 12 is a receiver, such as a PD, it is mounted on the submount 14, along with a TIA chip. The PD may be wirebonded to the circuit on the submount 14. Test may be performed to confirm that the PD is operative to receive an optical device and output an electrical signal after assembly. In the case of a transceiver, the above procedures are combined to test the separate receiving and transmitting functions. The photonic device 12 may include a plurality of receivers, transmitters and/or transceivers mounted on the submount 14.

Referring to FIG. 6B, the submount 14 of the photonic device assembly is attached to the opposing surface of the base 13 of the optical bench 11, at a position in which the photonic device 12 is in optical alignment with the optical bench 11, where the input/output of the photonic device 12 is optically aligned with the output/input of the optical bench 11, so that the optical path 22 achieves the desired optical coupling efficiency between the photonic device 12 and the optical fiber 20. In the illustrated embodiment in FIG. 2B, the optical path 22 is between the input/output end face of an optical fiber 20 and the output/input of a corresponding optical device 12, which is bent and reshaped by the reflective surface 17 (e.g., an aspherical mirror surface). More specifically in the illustrated embodiment, the optical path is in a direction out of the plane of the base 13, which is generally perpendicular to the plane of the base 13. As shown in FIG. 2B, the plane of the submount 24 is parallel to the plane of the base 13. A frame 32 is provided as a spacer between the submount 14 and the opposing surface of the base 13, to provide a space to accommodate the photonic device 12 between the submount 14 and the base 13. In the illustrated embodiment, there is an array of four reflective surfaces 17 corresponding to an array of four optical fibers 20.

The photonic device 12 may be passively aligned with the optical bench 11 (e.g., by relying on alignment indicia (not shown) provided on the base of the bench 11). Alternatively, the photonic device 12 and the optical bench 11 may be actively aligned by passing an optical signal between the optical waveguide (i.e., the optical fibers 20) in the optical bench 11 and the photonic device 12, and measuring the strength of the optical signal in the optical path to determine the optical coupling that indicates an optically aligned state. The photonic device 12 (e.g., a VCSEL and/or PD) can be activated to allow for active alignment with the optical fibers supported in the optical bench 11, without having to rely on the other components within the optoelectronic package to which the optical bench subassembly 10 is to be installed. For example, in the case where the photonic device 12 is a transmitter (e.g., a VCSEL), it is energized to emit light to the reflective surface 17 to be directed to the end face of the corresponding optical fiber 20. The strength of the optical signal transmitted via the reflective surface 17 and through the corresponding optical fiber is measured to determine optical coupling between the transmitter and the optical bench 11. In the case where the photonic device is a receiver (e.g., PD), an optical signal is supplied through the optical fiber, which is reflected by the reflective surface to a corresponding receiver. The extent of optical coupling between the optical fiber and the receiver can be determined from the electrical output of the receiver (which corresponds to strength of the optical signal received), so as to identify the aligned state. The active alignment process involves moving the photonic device 12 in the plane of the submount 14, with respect to the reflective surfaces 17, while the optical coupling efficiency is determined for the alignment point. To facilitate electrical connection to undertake active alignment, electrically conductive pads are provided on the surface of the submount that face away from the base 13.

Upon achieving desired optical alignment, the submount 14 of the photonic device 12 is fixedly attached to the base of the optical bench, e.g., by laser welding, soldering or epoxy.

After assembly of the optical bench subassembly 10, it can be burned-in to eliminate early-life failures and further functionally tested.

The foregoing embodiments of the optical bench subassembly 10 that include the integrated photonic device 12 are hermetic feedthrough with the integrated photonic device 12.

Figure 1B:
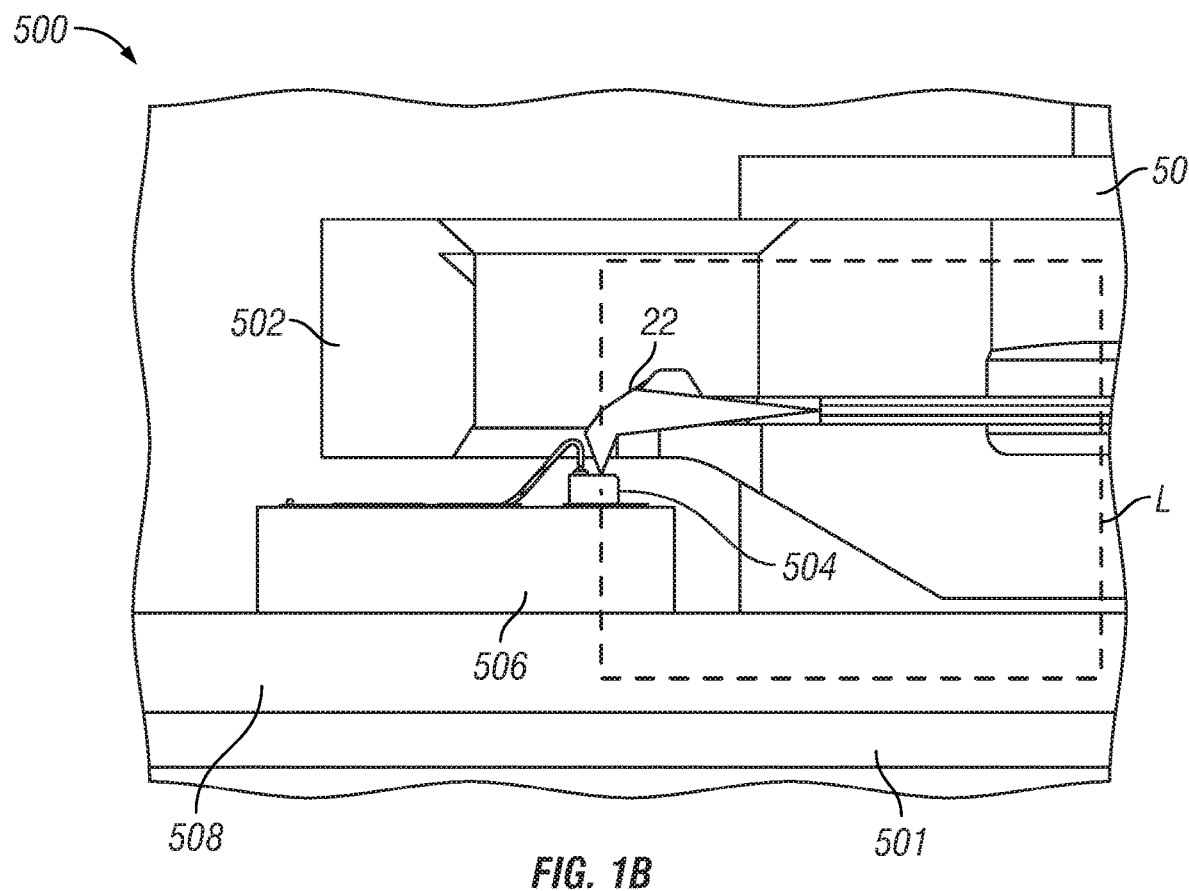
FIG. 1B is a sectional view taken along line 1B-1B in FIG. 1A.
Figure 5:
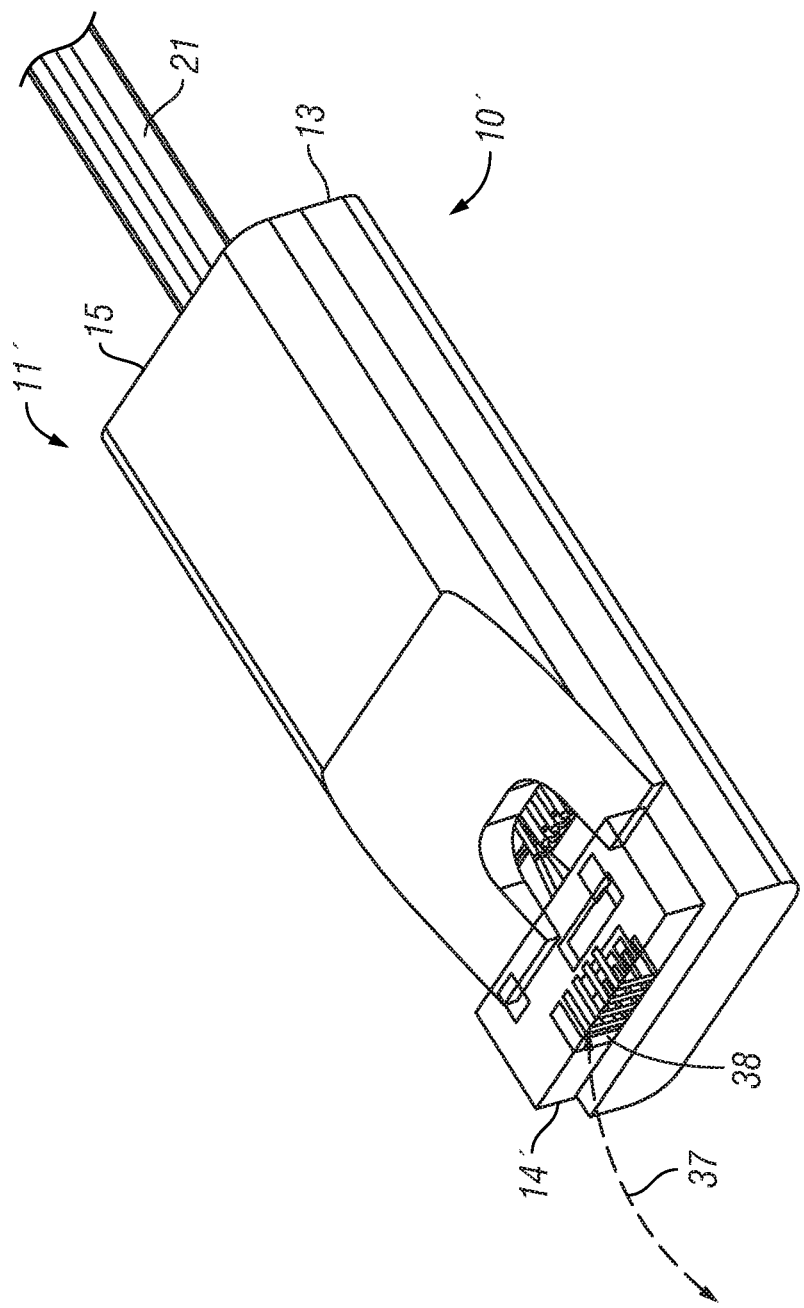
FIG. 5 illustrates an alternate embodiment of a submount for the photonic device in the optical bench subassembly.

Referring to FIG. 6C, and as shown in FIG. 2B, upon completing the assembly of the optical bench subassembly 10, it is hermetically attached to an optoelectronic package 500' (e.g., by soldering), which can be similar to the package 500 in FIG. 1A, except that the photonic device 12 is integrated in the optical bench subassembly 10, in optical alignment with the optical bench 11. The optoelectronic package 500' is populated with various components (e.g., ICs, chips, submounts, circuit boards, etc.). The optical bench subassembly 10 as a hermetic feedthrough is inserted through the opening of the snout 50 in the sidewall of the housing 501' of the package 500' and hermetically sealed (e.g., by soldering). As compared to the situation in FIG. 1B, the position of this feedthrough with respect to the package 500' is not as critical since there is no optical alignment required between the feedthrough and an external photonic device within the package 500'. As shown in FIG. 2B, the submount 14 may be solder bonded to a printed circuit board 39 (which could be a flexible printed circuit board) within the package 500', with vias 36 provided through the substrate of the submount 14 to connect to the photonic device 12 on the other side of the submount 14. A ball-grid array (BGA) with micro solder ball joints may be configured on the submount 14. Other electrical connections may include the optical bench subassembly 10' in the embodiment of FIG. 5, in which wrap-around traces 38 provided on the side of the submount 14' are electrically connected to a circuit board (not shown) in the package 500' by a wire bond or flex circuit joint 37. Alternatively, spring pins (not shown) may be configured to make the electrical connections between the submount and a printed circuit board in the package 500'. These electrical connections absorb error motion and stress due to thermal expansion/contraction, which would not affect the optical alignment between the photonic device that is integrated onboard the optical bench in the optical bench subassembly.

Figure 7:
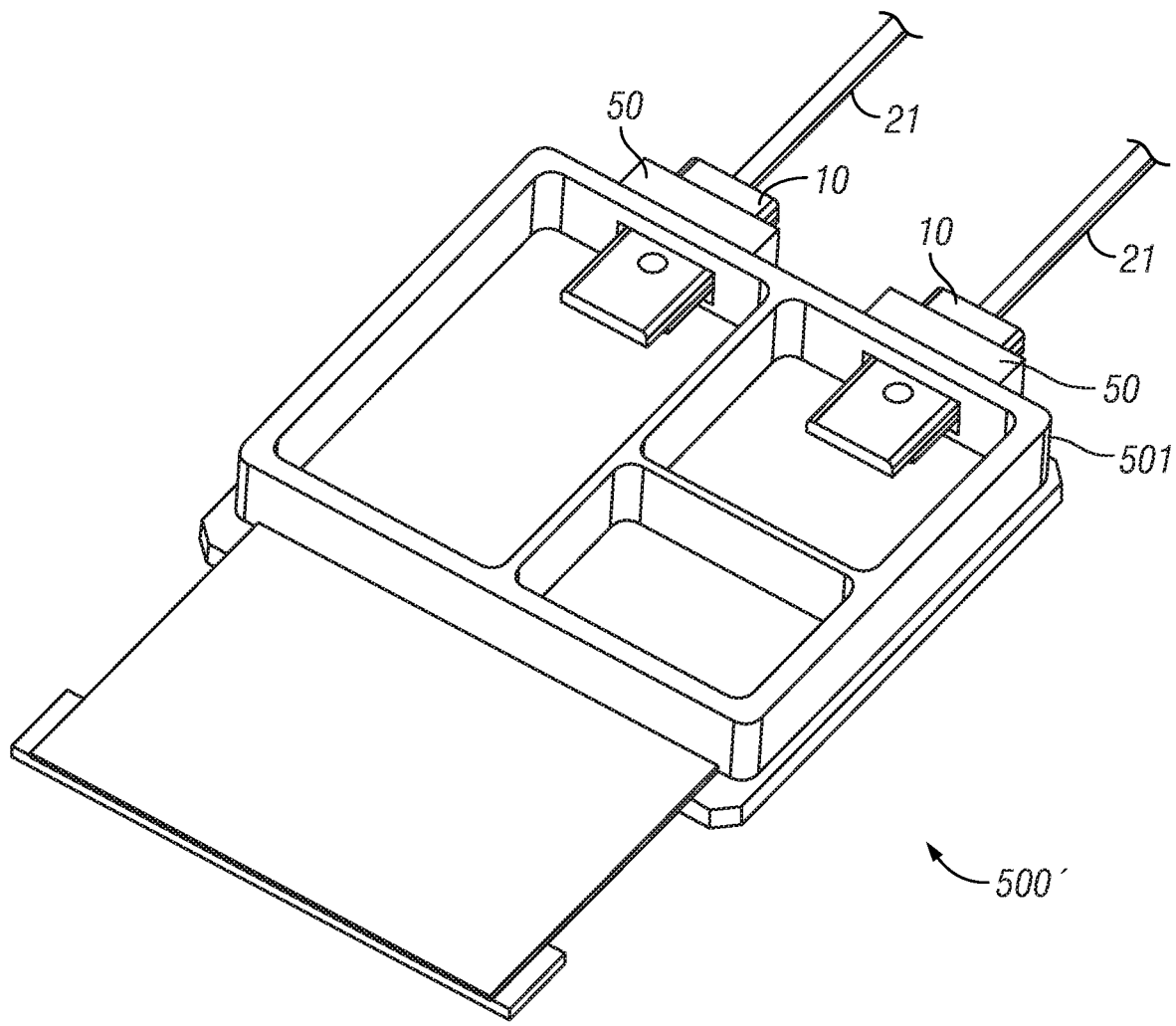
FIG. 7 illustrates the hermetic feedthrough as installed in the hermetic optoelectronic package.

FIG. 7 illustrates the hermetic feedthrough/optical bench subassembly 10 as installed in the hermetic optoelectronic package 500'. The other electronics and circuit components are omitted from view in FIG. 7. The hermetic cover of the hermetic optoelectronic package 500' is also omitted from view.

After assembly of the optical bench subassembly 10 to the hermetic optoelectronic package 500', the package 500' can be burned-in to eliminate early-life failures and further functionally tested.

Given the present invention preassemblies optical elements and components and photonic devices precisely in an optical bench subassembly prior to assembling into the larger optoelectronic package, the optical bench subassembly can be functionally tested, including burn-in tests, in a subassembly level, outside of an optoelectronic package, thus reducing waste of more expensive packages (which includes expensive circuit components, such as ICs, etc.) arising from early failure in the photonic devices installed therein. The active alignment process for the optical bench subassembly is much easier. Further, much smaller and more robust structural loop is present between the optical bench and the photonic device. Thus overall higher yield, higher reliability and lower manufacturing costs can be achieved for optoelectronic packages incorporating the hermetic feedthrough in accordance with the present invention.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A method of forming a photonic subassembly, comprising:
   (a) providing a photonic device subassembly comprising:
      a submount having electrical contacts at a surface thereof; and
      at least a photonic device mounted on a top surface of the submount;
   (b) providing a hermetic optical bench subassembly for routing optical signal comprising:
      an optical bench comprising a base, wherein at least a structured surface and at least one alignment structure are defined on a surface of the base, wherein the structured surface has a surface profile that reshapes and bends an incident light;
      at least one optical fiber positioned with the alignment structure in optical alignment with the structured surface;
      a cover; and
      a hermetic sealant hermetically attaching the cover to the base and hermetically sealing a space around a section of the array of the optical fibers between the cover and the base, wherein the optical fiber is hermetically sealed to the base;
   (c) assembling a photonic subassembly, comprising:
      aligning the photonic device in the photonic device subassembly as provided in (a) in optical alignment to the structured surface in the hermetic optical bench subassembly having the optical fiber hermetically sealed to the base as provided in (b);
      fixedly attaching the submount in the photonic device subassembly to the base in the hermetic optical bench subassembly having the optical fiber hermetically sealed to the base upon optical alignment of the photonic device in the photonic device subassembly to the structured surface in the hermetic optical bench subassembly.

2. The method of claim 1, wherein the structured surface and the alignment structure are integrally defined on the base by stamping a malleable metal material of the base.

3. The method of claim 2, wherein the optical signal is transmitted along the defined optical path between the photonic device in the photonic device subassembly and the optical fiber in the hermetic optical bench subassembly via the structured surface without relying on a refractive optical element between the optical fiber and the structured surface.

4. The method of claim 2, wherein the structured surface conforms to an aspheric reflective surface profile.

5. The method of claim 4, wherein the aspheric reflective surface is structured to reshape light to couple input/output of the optical fiber and the photonic device without relying on a refractive optical element between the input/output of the optical fiber and photonic device.

6. The method of claim 1, wherein an array of structured surfaces and a plurality of alignment structures are defined on the base, and wherein an array of optical fiber are positioned with the alignment structures to optically align the optical fibers with corresponding one of the structured surfaces.

7. The method of claim 6, wherein the cover does not extend to cover the structured surface, thereby to result in a hermetic feedthrough.

8. The method of claim 1, wherein the photonic subassembly is assembled in (c) by actively aligning the photonic device in the photonic device subassembly as provided in (a) in optical alignment to the structured surface in the hermetic optical bench subassembly as provided in (b), and fixedly attaching the submount in the photonic device subassembly to the base in the hermetic optical bench subassembly upon actively aligning the photonic device in the photonic device subassembly to the structured surface in the hermetic optical bench subassembly.

9. The method of claim 8, further comprises testing the photonic device subassembly prior to assembling the photonic subassembly in (c).

10. A method of forming a hermetic optoelectronic package comprising providing a photonic subassembly as assembled in claim 1, further comprising:
    (d) providing a hermetic package comprising:
       a housing having an opening sized to receive the hermetic optical bench subassembly in the photonic subassembly; and
       a circuit board within the housing, wherein the circuit board comprises electrical circuits and electronic components populated on the circuit board; and
    (e) hermetically assembling the photonic subassembly to the hermetic package as provided in (d), comprising:
       positioning a section of the hermetic optical bench subassembly in the photonic subassembly at the opening in the housing of the hermetic package;
       electrically attaching the electrical contacts of the submount in the photonic device subassembly to the electrical circuits on the circuit board, wherein the electrical contacts are exposed at a bottom surface of the submount prior to attaching to the electrical circuits; and
       hermetically attaching the section of hermetic optical bench subassembly at the opening to the housing.

11. The method of claim 10, further comprises functionally testing the photonic subassembly as assembled in (c) prior to assembling to the hermetic package in (e).

12. The method of claim 10, wherein the photonic subassembly as assembled in (c) is functionally tested at a subassembly level, including burn-in tests prior to hermetically attaching the section of the hermetic optical bench subassembly at the opening to the housing.

13. A photonic subassembly, comprising:
  a photonic device subassembly, which comprises:
    a submount having electrical contacts at a surface thereof for mounting to an external circuit; and
    at least a photonic device mounted on a top surface of the submount,
  a hermetic optical bench subassembly, which comprises:
    an optical bench comprising a base, on which at least a structured surface and at least one alignment structure are defined on the base, wherein the structured surface has a surface profile that reshapes and bends an incident light;
    at least one optical fiber positioned with the alignment structure in optical alignment with the structured surface;
    a cover; and
    a hermetic sealant hermetically attaching the cover to the base and hermetically sealing a space around a section of the array of the optical fibers between the cover and the base, wherein the optical fiber and the base are hermetically sealed,
  wherein the photonic device in the photonic device subassembly is in optical alignment to the structured surface in the hermetic optical bench subassembly, and
  wherein the submount in the photonic device subassembly is fixedly pre-attached to the base in the hermetic optical bench subassembly upon optical alignment of the photonic device in the photonic device subassembly to the structured surface in the hermetic optical bench subassembly prior to mounting the submount to the external circuit.

14. The photonic subassembly as in claim 13, wherein the base is an integral body on which the structured surface and the alignment structure are integrally defined on the body by stamping a malleable metal material of the body.

15. The photonic subassembly as in claim 14, wherein the optical signal is transmitted along the defined optical path between the photonic device in the photonic device subassembly and the optical fiber in the hermetic optical bench subassembly via the structured surface without relying on a refractive optical element between the optical fiber and the structured surface.

16. The photonic subassembly as in claim 15, wherein the structured surface conforms to an aspheric reflective surface profile.

17. The photonic subassembly as in claim 13, wherein an array of structured surfaces and a plurality of alignment structures are defined on the base, and wherein an array of optical fiber are positioned with the alignment structures to optically align the optical fibers with corresponding one of the structured surfaces.

18. The photonic subassembly as in claim 17, wherein the cover does not extend to cover the structured surface, thereby to result in a hermetic feedthrough.

19. The photonic subassembly as in claim 13, wherein the submount in the photonic device subassembly is attached to the base in the hermetic optical bench subassembly, upon actively aligning the photonic device in the photonic device subassembly to the structured surface in the hermetic optical bench subassembly with the top surface of the submount facing the structured surface in the optical bench, and with the photonic device in active optical alignment with the structured surface.

20. A hermetic optoelectronic package comprising the photonic subassembly as in claim 13, further comprising:
  a hermetic package, which comprises:
    a housing having an opening sized to receive the hermetic optical bench subassembly in the photonic subassembly;
    a circuit board within the housing, wherein the circuit board comprises electrical circuits and electronic components populated on the circuit board,
  wherein the electrical contacts of the submount are exposed at the bottom surface of the submount in the photonic device subassembly, and wherein the exposed electrical contacts are electrically attached to the electrical circuits on the circuit board, and
  wherein the photonic subassembly, with the photonic device in the photonic device subassembly in optical alignment to the structured surface in the hermetic optical bench subassembly, is hermetically attached to the hermetic package with a section of the hermetic optical bench subassembly in the photonic subassembly at the opening in the housing of the hermetic package.

* * * * *